17-363

Dec. 22, 1942. W. J. CLEMENTS Re. 22,238

VACUUM CLEANER

Original Filed July 1, 1939 2 Sheets-Sheet 1

Inventor.
William J. Clements,
by Parker & Carter
Attorneys.

Dec. 22, 1942. W. J. CLEMENTS Re. 22,238

VACUUM CLEANER

Original Filed July 1, 1939 2 Sheets-Sheet 2

Inventor.
William J. Clements.
by Parker Plante
Attorneys.

Reissued Dec. 22, 1942

Re. 22,238

UNITED STATES PATENT OFFICE 22,238

VACUUM CLEANER

William J. Clements, Chicago, Ill., assignor to Clements Mfg. Co., Chicago, Ill., a corporation of Illinois Original No. 2,245,760, dated June 17, 1941, Serial No. 282,372, July 1, 1939. Application for reissue August 17, 1942, Serial No. 455,129

13 Claims. (Cl. 230—117)

My invention relates to an improvement in vacuum cleaners.

One purpose is the provision of an improved vacuum cleaner of the type in which the dust bag, motor and fan are enclosed within a housing.

Another purpose is the provision of an improved fan and motor unit for use in such housing.

Another purpose is the provision of a fan and motor unit which can be unitarily removed from such a housing.

Another purpose is the provision of an improved fan structure.

Another purpose is the provision of a motor and fan unit adapted for easy bodily insertion and removal.

Another purpose is to provide such a unit which is insertable and removable through a cylindrical open end of a tank type housing.

Another purpose is the provision of supporting means for the motor and fan unit of a tank type cleaner which includes abutment means for limiting the penetration of the unit into the cylindrical open end of the housing.

Other purposes will appear from time to time in the course of the specification and claims.

I illustrate my invention more or less diagrammatically in the accompanying drawings wherein.

Like parts are indicated by like symbols throughout the specification and drawings.

Figure 1:
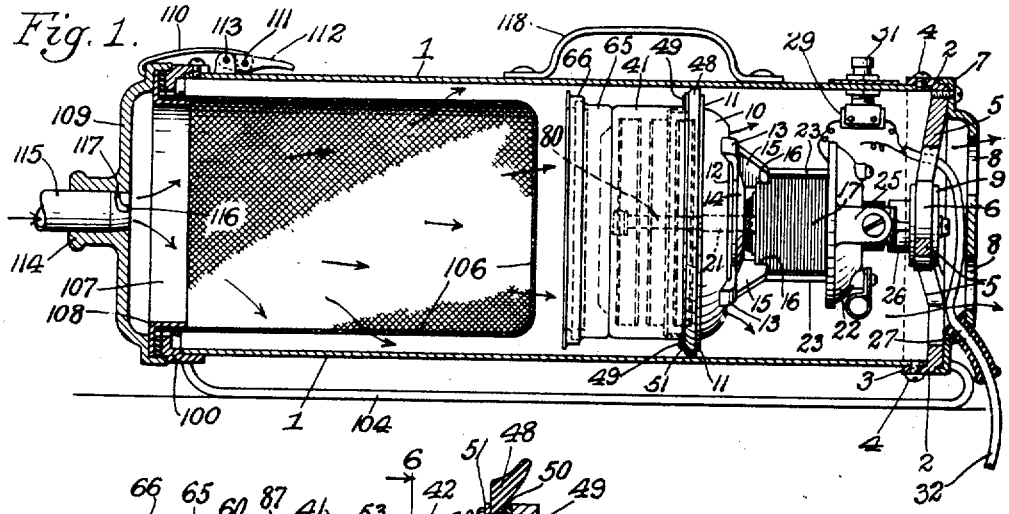
Fig. 1 is a longitudinal section of a cleaner casing with some of the mechanism in side elevation.

Referring to the drawings, 1 generally indicates a tubular or cylindrical housing, which has at one end a ring 2, including a flange portion 3 which fits about the exterior of one end of the housing 1.

The ring is shown as removably secured to the exhaust end of the housing and as engaging or abutting against the end of the housing when secured.

4 indicates any suitable screws or other securing means whereby the ring may be secured to the housing. 5 indicates a spider structure extending generally radially inwardly from the ring and supporting the inner hub 6, herein shown as unitary with the spider and ring.

7 is any suitable removable covering or cap having any suitable air outlet apertures 8. 9 is a ring of rubber or the like set within a central aperture of the hub 6. 10 generally indicates a shield or ring having a circumferential flange 11 and a central air aperture 12, which element forms part of the fan assembly. Extending inwardly from the inner edge of the ring 10 are supports 13, which carry an inner ring 14, which extend inwardly in the form of ribs, as at 15, and are provided with ledge abutments 16, which receive the motor field laminations 17. The bearing sleeve 18 is mounted upon inwardly extending arms 19 unitary with the above described structure. Any suitable anti-friction bearings 20 may be mounted in the sleeve 18 to support the motor shaft 21, which carries any suitable motor armature rotating within the field laminations 17.

22 is an abutment ring abutting against the opposite end of the group of field laminations 17. Any suitable means, for example bolts 23, may be employed for clamping it and for thereby holding the laminations 17 against the abutment ledges 16 of the members 15. The ring 22 also is adapted to support any suitable brushes as upon the bridge 25, which brushes cooperate with the commutator of the motor. 26 is a generally cylindrical outer extension of the bridge 25, which penetrates the central aperture within the rubber sleeve 9.

Any suitable switch structure may be used, generally indicated as 28, 29, the details of which do not of themselves form part of the present invention. I illustrate, however, two separate outwardly extending manually manipulatable switch members 30, 31. 32 indicates any suitable conductive line extending to any suitable source of electric power not herein shown.

Figure 2:
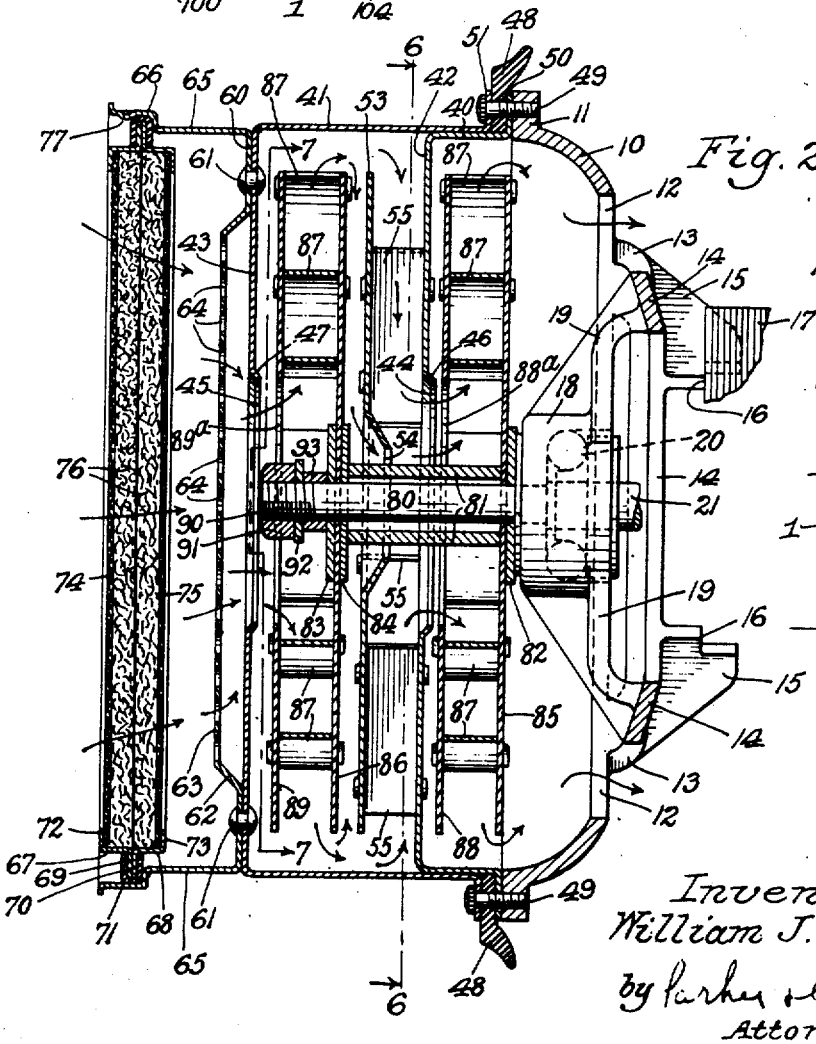
Fig. 2 is a sectional view of the strainer and fan parts.
Figure 9:
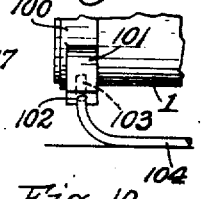
Fig. 9 is a detail of the forward end.
Figure 10:
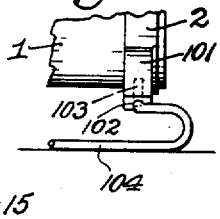
Fig. 10 is a detail of the rear end.
Figure 3:
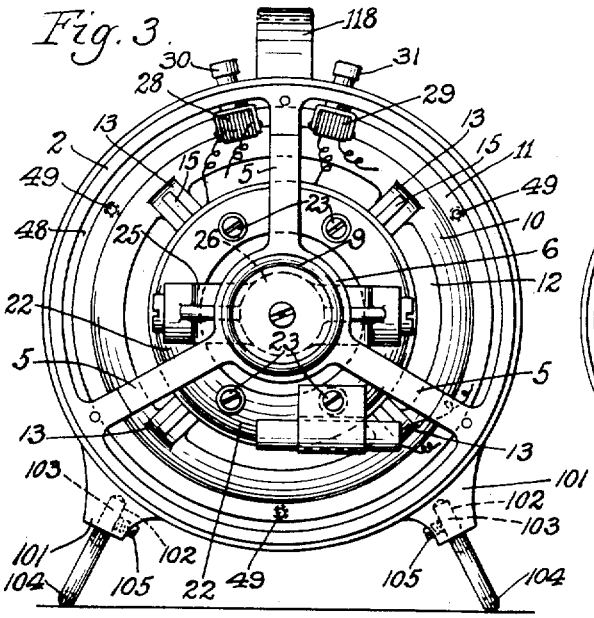
Fig. 3 is a rear elevation with back cover removed.
Figure 4:
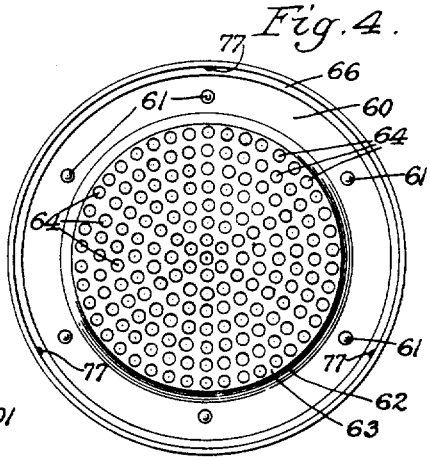
Fig. 4 is a face view of the strainer housing.
Figure 5:
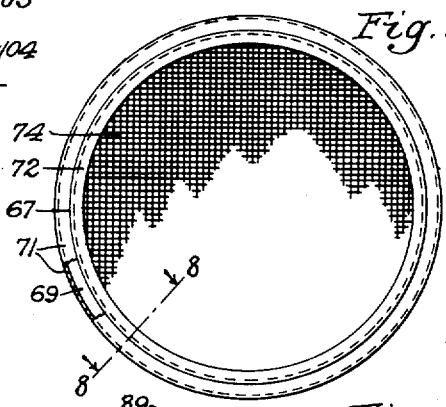
Fig. 5 is a face view of the strainer removed from the housing.
Figure 6:
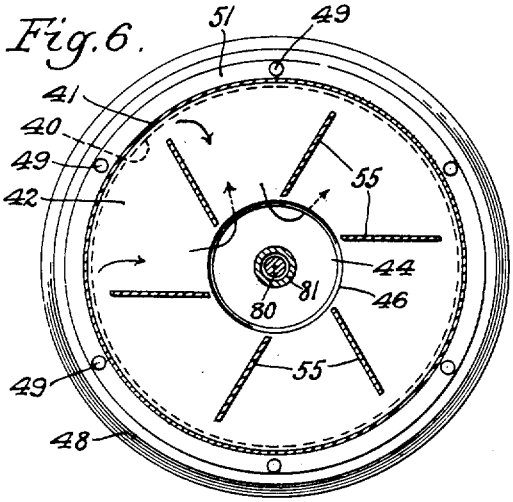
Fig. 6 is a section at the line 6—6 on Fig. 2.
Figure 7:
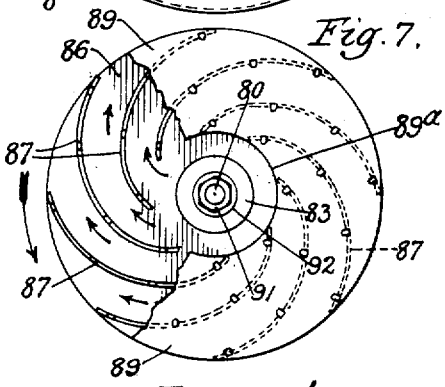
Fig. 7 is a section at the line 7—7 on Fig. 2.
Figure 8:
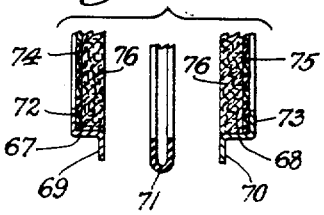
Fig. 8 is a section at the line 8—8 on Fig. 5, with the parts separated.

Mounted upon the flange 11 of the ring 10 is a fan housing structure, which includes two nesting cylindrical housing members 40, 41, carrying inwardly extending partition walls 42, 43, each centrally apertured as at 44, 45, the central aperture being bordered by an inturned lip 46, 47. The two members 40, 41 are secured as shown in Fig. 2. They provide a fan housing separated into two main compartments. In order to support the ring 10 for ready endwise removal from the housing 1, I provide a yielding compressible ring 48 of rubber or the like. Unitary locking means, such as the screws 49 may be employed for locking the rubber ring 48 between the flanges 50, 51, of the members 40 and 41, respectively.

Mounted on one face of the wall 42, I provide an additional partition 53, the outer edge of which terminates short of the inner face of the member 41. This partition is centrally apertured as at 54 and carries a plurality of fixed vanes 55, preferably somewhat inclined from the radial.

Mounted on the outer face of the partition wall 43 is an air filter assembly, which includes the ring 60, which may be riveted as at 61 to the wall 43 is an air filter assembly, which includes portion or ledge 62 and an intermediate portion 63, provided with air inlets 64. The ring 60 carries at its outer edge the unitary cylindrical wall 65 having a ledge 66 adapted to receive a filter structure, including rings 67, 68, having abutting outwardly extending flanges 69, 70, secured together as by an enveloping circumferential rubber ring 71, generally U-shaped in cross section. Inwardly extending flanges 72, 73 embrace any suitable filter structure, which may be formed by layers of mesh 74, 75, with any suitable intermediate packing confined therebetween. The filter ring may be locked in position as by the inwardly offset portions 77.

The motor shaft 21 is shown as having an extension 80 into the fan housing. It may be positioned in relation to the bearing 20 in any suitable manner. I illustrate a hub structure, including a sleeve 81, with spacing washers 82, 83, and 84. Mounted on the shaft extension 80 and spaced by the sleeve 81, are fan discs 85, 86, each carrying a plurality of arcuate vanes 87, which support rings 88, 89, apertured at **88*a* and 89*a*. The inner end of the shaft extension 80 is screw threaded as at 90 and receives a locking nut 91, abutting against a washer 92 and a sleeve 93, the fan disc 86 being confined between the washers 83 and 84**.

It will be observed, as in Fig. 2, that, in response to the rotation of the motor and of the fan structure, air is drawn inwardly in the direction of the arrows through the filter and the foraminous plate 63. Air then passes through the aperture 45 and into the first fan, being directed outwardly toward the inner face of the wall 41. It then passes inwardly along the fixed baffles 55 through the central aperture 44, and also through the aperture 54 of the baffle 53, and is then directed outwardly by the second fan. Air is deflected by the ring 10 and passes about the above described motor structure and then upwardly through the spider 5 to the air outlet passage 8, thus cooling the motor.

It will be noted that the entire fan and motor assembly can be readily and unitarily removed from the housing 1 by simply releasing the screws 4 and the below described runner structure.

The ring 2 serves as an abutment for limiting the penetration of the motor and fan unit into the open end of the housing.

Another ring 100 is mounted at the opposite end of the housing. The rings 2 and 100 are both provided with outwardly extending lugs 101, which may be apertured as at 102 to receive the recurved upbent ends 103 of any suitable runner structures 104. 105 indicate locking set screws in the lugs 101 adapted to lock the runners in place.

106 is any suitable bag structure having an open end 107 and any suitable supporting ring 108 abutting against a portion of the ring 100, with a rubber gasket ring between. 109 is any suitable closure which may be locked in position, for example by a plurality of locking hooks 110 pivoted as at 111 on the locking lever 112, which is pivoted at 113 on the casing 1. The closure 109 is provided with a centrally apertured sleeve 114 adapted to receive any suitable suction inlet or hose connection 115, which is provided with a bayonet slot 116 adapted to receive any suitable locking pin 117. 118 is any suitable carrying handle secured to the top of the housing 1.

It will be observed that the housing cap 7 is apertured as at 27 to permit the entry of the conductive connection 32. The relation between the aperture and the conductive connection is such that the cap 7 can be removed without disturbing the conductive connection. The switch structure 28, 29, 30, 31 may also be readily disconnected from the housing 1 and withdrawn with the unit in order to prevent any impediment to the endwise outward movement of the motor and fan assembly.

It will be realized that whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:

I provide a unitary open-ended tubular housing 1, to which the opposite ends of the rings 2 and 100 are applied and from which they may be readily removed if necessary. Air flows inwardly through the hose connection 115 from any suitable suction nozzle not herein shown. This air, filled with dirt, flows into the interior of the bag 106 and is constrained to flow through the fabric or mesh of which the bag is formed, there depositing the dust or dirt which it carries. The air then flows through the filter structure, which includes the fibrous material 76. If desired, any suitable disinfectant may be employed to impregnate the filter structure. The air then flows through the two-stage fan, elsewhere herein described and shown, and thence outwardly about the motor. Referring to Fig. 2, the ring 10 directs air inwardly through the aperture 12, the ring or shield member 10 constituting a directing lip. Air is thus directed by the exterior of the laminations 17. Air is also directed directly into the motor structure in the space extending between the spider arms 19. There is thus no substantial impediment to the direction of cooling air about and through the motor. The entire fan and motor unit may readily be removed from the housing 1 for inspection or repair.

The ring 48 serves as a vibration preventing support for one end of the fan and motor unit, and the other end is supported in the rubber ring 9. However, since the rubber ring 9 is supported upon the ring 2 and its associated spider structure, and since the ring 48 is slidable in relation to the housing 1, the entire motor and fan unit, although readily removable, is also sufficiently supported in a vibration preventing relationship to the housing 1.

Search Room

The ring 2 serves as a limiting abutment for the insertion of the motor and fan unit into the cylindrical open end of the housing. The unit is inserted fan first into the exhaust end of the housing 1, and the ring 48 slides along the inner face of the housing and serves as a continuing guide during insertion and as a support for the inner end of the unit when the unit is fixed in position. The ring 2 serves as an abutment for limiting the penetration of the unit into the open end of the housing when the ring 2 engages the edge of the housing 1. All that is necessary, in order to secure the parts, is to align the apertures for the screws 4. A single aligning action is necessary, since if one pair of apertures is aligned, all of the rest of them are also, and the screws 4 can readily and quickly be inserted. Note that it is not necessary to remove the outer cover 7 in the course of the insertion, or removal, of the motor and fan unit. It will be observed that the outer housing 1 is a cylinder of uniform diameter from end to end. The dust bag and its associated parts are inserted into and secured to one end of the housing, which may be called the intake or suction end. Into the opposite or discharge end of the housing the motor and fan unit can be inserted and removed without disturbance to the dust bag structure. The ring 2 performs the function of a limiting stop for limiting the inward movement of the motor and fan unit. It also serves as an outer end supporting means for the motor and fan unit. Also, the outer closure 7 is removably secured to the ring 2, and the entire unit, including the outer closure, can be removed bodily, or the outer closure can be removed from the ring 2 without interfering with the location or securing of the unit as a whole. The hub structure 6, 9 is generally co-planar with the ring 2 and is protected thereby as well as positioned.

I claim:

1. In a vacuum cleaner, a generally cylindrical exterior housing of substantially uniform interior diameter from end to end, means for normally supporting it in generally horizontal position, a motor and fan assembly entirely contained therein and insertable and removable through the exhaust end thereof, and means for securing said motor and fan assembly to said housing, including a ring removably engaging an end of the housing, a spider in said ring, a generally central hub in said spider, the motor assembly including a portion penetrating said hub, a supporting element of yielding compressible material interposed between said hub and the penetrating portion of said motor, a fan housing secured to said motor assembly, and a slidable supporting connection between said fan housing and the interior of said cylindrical housing, including a rubber washer secured to said fan housing and adapted to act as a seal between said fan housing and the inner face of said cylindrical housing, the motor and fan assembly penetrating a cylindrical end portion of the housing, the outer end of which is of substantially the same diameter as the portion engaged by the rubber washer when the motor and fan assembly is secured within the housing.

2. In a vacuum cleaner, a generally cylindrical exterior housing of substantially uniform interior diameter from end to end, means for normally supporting it in generally horizontal position, a motor and fan assembly entirely contained therein and insertable and removable through the exhaust end thereof, and means for securing said motor and fan assembly to said housing, including a ring removably engaging an end of the housing, a spider in said ring, a generally central hub in said spider, the motor assembly including a portion penetrating said hub, a fan housing secured to said motor assembly, and a slidable supporting connection between said fan housing and the interior of said cylindrical housing, including a rubber washer secured to said fan housing and adapted to act as a seal between said fan housing and the inner face of said cylindrical housing, the motor and fan assembly penetrating a cylindrical end portion of the housing, the outer end of which is of substantially the same diameter as the portion engaged by the rubber washer when the motor and fan assembly is secured within the housing.

3. In a vacuum cleaner, a generally cylindrical exterior housing of substantially uniform interior diameter from end to end, means for normally supporting it in generally horizontal position, a motor and fan assembly entirely contained therein and insertable and removable through the exhaust end thereof, and means for securing said motor and fan assembly to said housing, including a ring removably engaging an end of the housing, a generally central hub, and means for supporting it in said ring, the motor assembly including a portion penetrating said hub, a supporting element of yielding compressible material interposed between said hub and the penetrating portion of said motor, a fan housing secured to said motor assembly, and a slidable supporting connection between said fan housing and the interior of said cylindrical housing, including a rubber washer secured to said fan housing and adapted to act as a seal between said fan housing and the inner face of said cylindrical housing, the motor and fan assembly penetrating a cylindrical end portion of the housing, the outer end of which is of substantially the same diameter as the portion engaged by the rubber washer when the motor and fan assembly is secured within the housing.

4. In a vacuum cleaner, a generally cylindrical exterior housing of substantially uniform interior diameter from end to end, means for normally supporting it in generally horizontal position, a motor and fan assembly entirely contained therein and insertable and removable through the exhaust end thereof, and means for securing said motor and fan assembly to said housing, including a ring removably engaging an end of the housing, a generally central hub, and means for supporting it upon said ring, the motor assembly including a portion penetrating said hub, a fan housing secured to said motor assembly, and a slidable supporting connection between said fan housing and the interior of said cylindrical housing, including a rubber washer secured to said fan housing and adapted to act as a seal between said fan housing and the inner face of said cylindrical housing, the motor and fan assembly penetrating a cylindrical end portion of the housing, the outer end of which is of substantially the same diameter as the portion engaged by the rubber washer when the motor and fan assembly is secured within the housing.

5. In a vacuum cleaner, a generally cylindrical exterior housing of substantially uniform interior diameter from end to end, means for normally supporting it in generally horizontal position, a motor and fan assembly entirely contained therein and insertable and removable through the exhaust end thereof, and means for securing said motor and fan assembly to said housing, including a ring removably engaging an end of the housing, a generally central hub, and means for supporting it upon said ring, the motor assembly including a portion penetrating said hub, a fan assembly secured to said motor assembly, and a slidable supporting connection between said fan assembly and the interior of said cylindrical housing, including a rubber washer secured to said fan assembly and adapted to act as a seal between said fan housing and the inner face of said cylindrical housing, the motor and fan assembly penetrating a cylindrical end portion of the housing, the outer end of which is of substantially the same diameter as the portion engaged by the rubber washer when the motor and fan assembly is secured within the housing.

6. In a tank type vacuum cleaner, an outer housing having a generally cylindrical exhaust end portion, a motor and fan unit adapted for insertion directly inwardly into said exhaust end portion and including a motor, a fan operated by the motor, and a fan housing, slidable inner supporting means between said unit and the inner face of the housing, and supporting means for the outer end of the unit, including a ring adapted removably to engage and abut against the end edge of the cylindrical portion of the housing, and a supporting connection between said ring and the unit.

7. In a tank type vacuum cleaner, an outer housing having a generally cylindrical exhaust end portion, a motor and fan unit adapted for insertion directly inwardly into said exhaust end portion and including a motor, a fan operated by the motor, and a fan housing, slidable inner supporting means between said unit and the inner face of the housing, and supporting means for the outer end of the unit, including a ring adapted removably to engage and abut against the end edge of the cylindrical portion of the housing, and a supporting connection between said ring and the unit, and an end closure for the housing, removably secured to said ring and removable unitarily with the ring from the housing.

8. In a tank type vacuum cleaner, an outer housing having a generally cylindrical exhaust end portion, a motor and fan unit adapted for insertion directly inwardly into said exhaust end portion and including a motor, a fan operated by the motor, and a fan housing, slidable inner supporting means between said unit and the inner face of the housing, and supporting means for the outer end of the unit, including a ring adapted removably to engage and abut against the end edge of the cylindrical portion of the housing, and a supporting connection between said ring and the unit, the inner diameter of the housing being substantially uniform from the end edge of the housing through which the unit is inserted to the part of the housing engaged by said supporting means when the motor and fan unit is secured in position.

9. In a tank type vacuum cleaner, an outer housing having a generally cylindrical exhaust end portion, a motor and fan unit adapted for insertion directly inwardly into said exhaust end portion and including a motor, a fan operated by the motor, and a fan housing, slidable inner supporting means between said unit and the inner face of the housing, and supporting means for the outer end of the unit, including a ring adapted removably to engage and abut against the end edge of the cylindrical portion of the housing, and a supporting connection between said ring and the unit, said ring including a flange surrounding the exterior of the edge portion of the housing, and removable securing means extending through said flange and the housing.

10. In a tank type vacuum cleaner, an outer housing having a generally cylindrical exhaust end portion, a motor and fan unit adapted for insertion directly inwardly into said exhaust end portion and including a motor, a fan operated by the motor, and a fan housing, slidable inner supporting means between said unit and the inner face of the housing, and supporting means for the outer end of the unit, including a ring adapted removably to engage and abut against the end edge of the cylindrical portion of the housing, and a supporting connection between said ring and the unit, including a bearing hub for the motor, supported on the ring and substantially co-planar therewith.

11. In a tank type vacuum cleaner, an outer housing having a generally cylindrical exhaust end portion, a motor and fan unit adapted for insertion directly inwardly into said exhaust end portion and including a motor, a fan operated by the motor, and a fan housing, slidable inner supporting means between said unit and the inner face of the housing, and supporting means for the outer end of the unit, including a ring adapted removably to engage and abut against the end edge of the cylindrical portion of the housing, a supporting connection between said ring and the unit, and an air pervious cover plate mounted directly upon and removable with and from said ring.

12. In a tank type vacuum cleaner, an outer housing having a generally cylindrical exhaust end portion, a motor and fan unit adapted for insertion directly inwardly into said exhaust end portion and including a motor, a fan operated by the motor, and a fan housing, slidable inner supporting means between said unit and the inner face of the housing, and supporting means for the outer end of the unit, including a ring adapted removably to engage and abut against the end edge of the cylindrical portion of the housing, a supporting connection between said ring and the unit, including a bearing hub for the motor, supported on the ring and substantially co-planar therewith, and an air pervious cover plate mounted directly upon and removable with and from said ring.

13. In combination, in a tank type vacuum cleaner including an outer housing, a motor and fan unit removably mounted therein, the motor including a rotor, bearing means for the opposite ends of the rotor, means for removably supporting said bearing means in relation to the outer housing, a fan mounted at one end of said rotor, a fan housing surrounding said fan, and a unitary deflector element connecting said fan housing and the fixed field portion of said motor, said unitary element including a portion adapted to deflect fan delivered air inwardly toward the exterior of the fixed field portion of the motor, said unitary member being also apertured to direct air endwise against the fixed field portion of the motor and the rotor, and constituting the support for the bearing means for the end of the rotor adjacent the fan.

WILLIAM J. CLEMENTS.